United States Patent

Pruksch et al.

[11] Patent Number: 5,955,941
[45] Date of Patent: Sep. 21, 1999

[54] METHOD AND DEVICE FOR CONTROLLING A VELOCITY OF A MOTOR VEHICLE

[75] Inventors: Achim Pruksch, Neudenau; Alain Gaillard, Karlsruhe, both of Germany

[73] Assignee: Robert Bosch GmbH, Stuttgart, Germany

[21] Appl. No.: 09/166,256

[22] Filed: Oct. 5, 1998

[30] Foreign Application Priority Data

Oct. 10, 1997 [DE] Germany ............... 197 44 720

[51] Int. Cl.$^6$ ....................................... B60Q 1/00
[52] U.S. Cl. ................ 340/435; 340/436; 340/903; 180/167; 701/96; 701/91
[58] Field of Search ................ 340/436, 903, 340/435, 469; 180/167, 169, 271; 701/36, 48, 96, 70, 91

[56] References Cited

U.S. PATENT DOCUMENTS

| | | | |
|---|---|---|---|
| 4,621,705 | 11/1986 | Etoh | 180/169 |
| 5,014,200 | 5/1991 | Chundrlik et al. | 364/426.04 |
| 5,173,859 | 12/1992 | Deering | 180/271 |
| 5,375,438 | 12/1994 | Davidian | 701/96 |
| 5,396,426 | 3/1995 | Hibino et al. | 701/96 |
| 5,529,139 | 6/1996 | Kurahashi et al. | 180/169 |
| 5,631,639 | 5/1997 | Hibino et al. | 340/903 |

FOREIGN PATENT DOCUMENTS

| | | |
|---|---|---|
| 40 35 451 | 5/1992 | Germany . |
| 195 30 289 | 2/1997 | Germany . |

Primary Examiner—Jeffrey A. Hofsass
Assistant Examiner—Julie Lieu
Attorney, Agent, or Firm—Kenyon & Kenyon

[57] ABSTRACT

A method and a device for adjusting the velocity of a motor vehicle to a programmable target velocity, with a current velocity of the controlled vehicle being measured. A distance sensor measures at least one distance to a vehicle or another obstacle in front of the controlled vehicle. The controlled vehicle is accelerated or decelerated as a function of at least the measured distance and the measured instantaneous velocity. A positive acceleration of the controlled vehicle ceases or is reduced, or the instantaneous velocity of the controlled vehicle is reduced, if a blinding sensor is used to determine that the driver of the controlled vehicle is being blinded by the light of oncoming traffic.

7 Claims, 3 Drawing Sheets

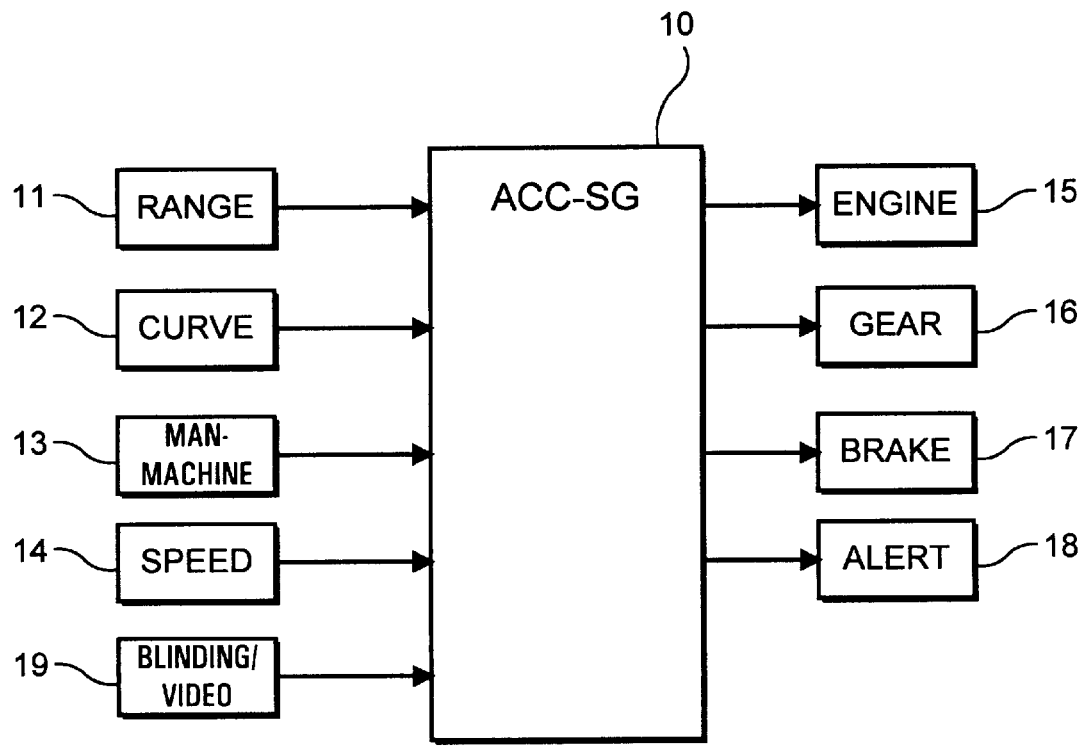
F I G. 1
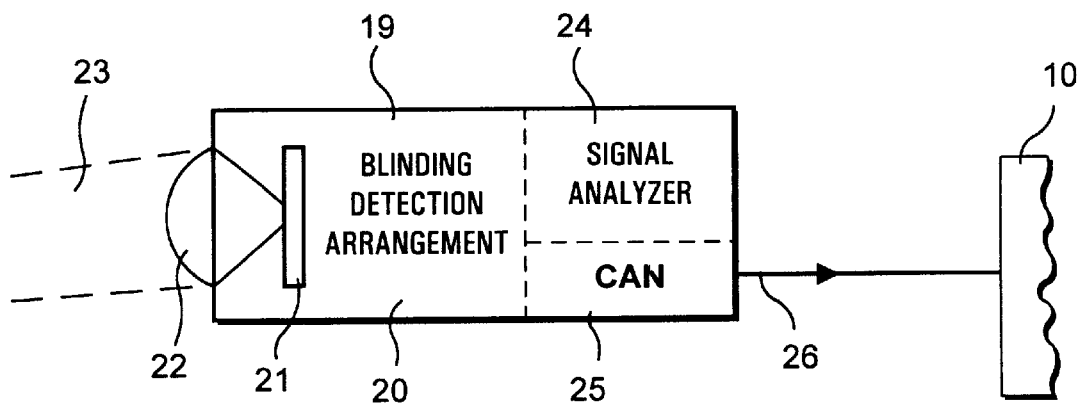
F I G. 2

METHOD AND DEVICE FOR CONTROLLING A VELOCITY OF A MOTOR VEHICLE

FIELD OF THE INVENTION

The present invention relates to a method for adjusting a velocity of a motor vehicle to a programmable target velocity, and to a device for carrying out the method according to the present invention.

BACKGROUND INFORMATION

A system for controlling the velocity of a motor vehicle is described, for example, in U.S. Pat. No. 5,014,200. This system maintains a velocity, which can be set by the operator, as long as there are no other vehicles driving in front of the controlled vehicle, and adjusts the vehicle velocity when another vehicle is detected ahead, in order to maintain a distance between the vehicles, which can also be programmed by the operator. An alarm distance is calculated as a function of the driver's reaction time. To enable the driver to set the distance between the vehicles, the vehicle operator can set the term for the driver reaction time. As described in U.S. Pat. No. 5,014,200, this should be done with a view to the driver's personal driving habits and with a view to certain weather, road, and traffic conditions. The disadvantage of this conventional system is that the driver must manually adjust the control response of the system to different situations. If the driver forgets a setting, or if an environmental condition changes very quickly, a dangerous situation, caused for example by unwanted acceleration of the controlled vehicle under the environmental condition, may occur.

German Patent Application No. 195 30 289 describes a sensor for determining visibility and road slickness which can compensate for driving too fast under poor visibility conditions and the use of an automatic distance-adjusting cruise control system for a kind of "blind flying." The purpose of this visibility sensor is to provide information about actual visibility, and it can also supply this information to the adaptive cruise control (ACC) system. However, the sensor can determine visibility only when this visibility is limited by fog or rain. The sensor cannot reliably determine that the motor vehicle driver is being blinded by the light of oncoming traffic.

German Patent Application No. 40 35 451 describes a method for protecting the vehicle driver from being blinded by the headlights of other vehicles by changing the luminance inside the vehicle, using an arrangement of optoelectronic components. However, this German Patent Application also does not provide for supplying information to a cruise control system in a motor vehicle when driver blinding is detected.

SUMMARY OF THE INVENTION

An object of the present invention is to provide a method and a device for controlling a velocity of a motor vehicle, which prevent the driver from being blinded by the light of oncoming traffic in order to avoid a dangerous situation.

An advantage of the method according to the present invention is that the control algorithm (provided for controlling the velocity) is more intelligent and therefore responds better to the situation. In particular, the method according to the present invention avoids a dangerous situation that may arise when the vehicle driver is blinded by the light of oncoming traffic and the vehicle moves at a high speed or even accelerates.

BRIEF DESCRIPTION OF THE DRAWINGS

FIG. 1 shows a block diagram of a device according to the present invention for controlling a velocity of a vehicle.

FIG. 2 shows a diagram of a sensor for determining that the driver is being blinded by a light of oncoming traffic.

DETAILED DESCRIPTION

Figure 3:
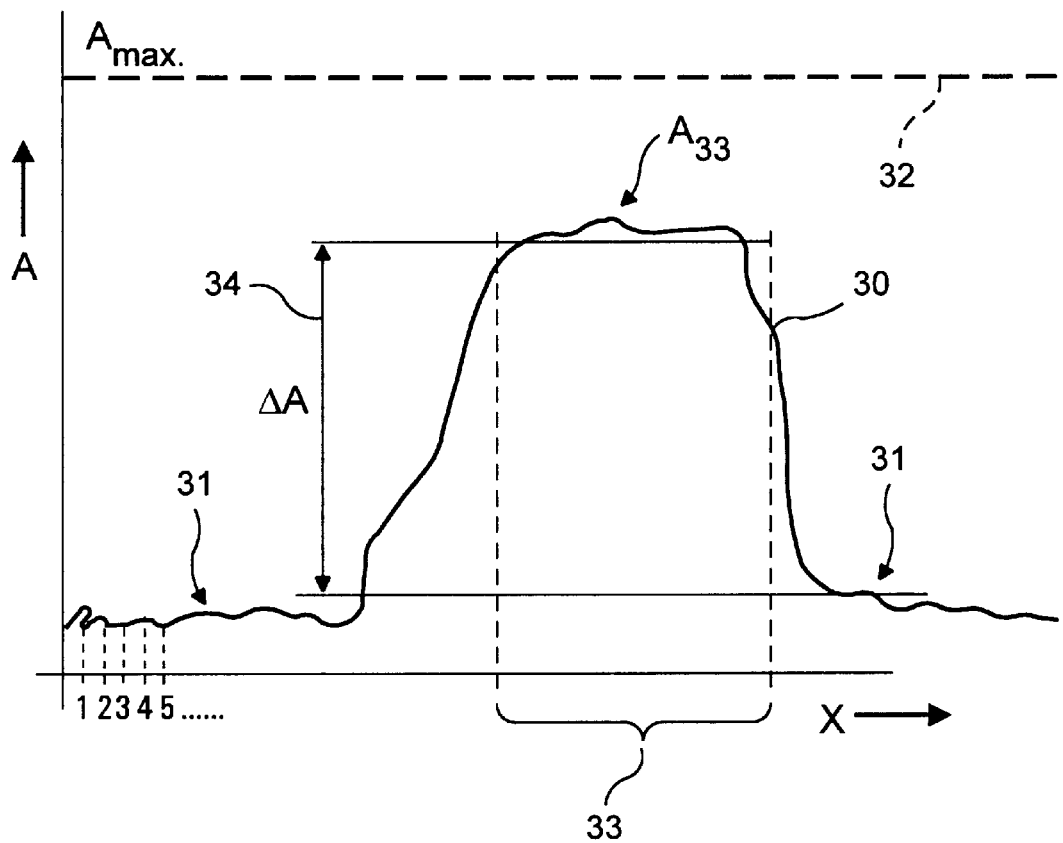
FIG. 3 shows a measuring signal of the sensor illustrated in FIG. 2.

FIG. 1 shows a block diagram of a device according to the present invention for controlling the velocity of a motor vehicle. The device includes a control unit 10 to which the measuring signals from other control units or sensors are supplied and which, based on the method according to the present invention, controls actuators which accelerate or decelerate the vehicle. The device also includes a sensor or a control unit 11 which can be used to measure the distance to vehicles in front of the controlled vehicle or to other objects. A sensor of this type, for example, can be a radar or light-wave distance measuring equipment. A sensor of this type is also used to measure the relative velocity between a detected vehicle in front of the controlled vehicle or a detected object and the controlled vehicle. Sensors 12 are provided whose measurement data reveals a heading of the controlled vehicle. Sensors of this type detect, for example, a steering angle, a rate of yaw, or a transverse acceleration of the controlled vehicle. Methods for determining a heading of the controlled vehicle based on measurement data of this type are known, particularly in the area of dynamic vehicle movement control. Sensor 12 can alternatively or additionally have a video recording unit which can be used to detect a lane and, based on this information, to determine a heading. An optional user interface 13 is provided which includes, for example, the switch described in U.S. Pat. No. 5,014,200 for setting the driver reaction time. A sensor or a controller 14 is also provided which can be used to measure the velocity of the controlled vehicle.

The output signals of the above-described controllers or sensors are supplied to control unit 10 in a conventional manner and processed by this unit. An engine controller 15, a transmission controller 16 and a brake controller 17 are provided, all of which are controlled by control unit 10. The velocity of the controlled vehicle can be increased or decreased by intervening in the above-mentioned vehicle components. A warning or information signal output 18 is provided, which can be used to inform the driver of the controlled vehicle, for example visually or acoustically, that the distance to a vehicle in front of the controlled vehicle is less than a preset safe distance. According to the present invention, the device also has a blinding detection means (arrangement) 19, which can be used to detect that the driver of the controlled vehicle is being blinded. The output signal of blinding detection means 19 is also supplied to control unit 10. If provided, blinding detection means 19 can also be combined with the video recording unit described above, enabling the latter to also perform the blinding detection function described below.

FIG. 2 shows an exemplary layout of blinding detection means 19. It includes a signal acquisition system 20, a signal analyzer 24, and an interface 25 via which the data or signals can be transmitted to control unit 10 in conjunction with a conductor 26. Signal acquisition system 20 includes a preferably one-dimensional array 21 of light-sensitive elements and a focusing optical system 22. The light-sensitive elements used can be, for example, photodiodes or phototransistors. Depending on the required accuracy of the blinding detection unit, and with proper focusing, an alternative to the design described above can have a two-dimensional array of light-sensitive elements or, conversely, only a single light-sensitive element instead of one-dimensional array 21. Focusing optical system 22 is designed so that at least one incoming light beam 23 from a spatial or angular range deemed to be relevant for the driver of the controlled vehicle is focused on array 21.

FIG. 3 shows a sample signal curve 30, which could be recorded by a one-dimensional array 21 of light-sensitive elements. A pixel number x, which corresponds to the actual sequence of light-sensitive elements within array 21, is plotted along the abscissa. A signal amplitude A, which corresponds to a detected light intensity, is plotted along the ordinate. An interval 33 of pixel numbers x is provided on which all light beams from the spatial or angular range deemed relevant for the driver of the controlled vehicle are focused via optical system 22. Regions 31 of signal curve 30 mark the beginning of a lower signal amplitude A which, in this case, represents the ambient luminosity outside the angular range deemed relevant for the driver. An absolute maximum value $A_{max}$ (or 32) and a relative maximum value $\Delta A$ (or 34) are shown in FIG. 3. Relative maximum value $\Delta A$ is applied to ambient luminosity 31. It is a measure of driver blinding, which occurs, for example, when the driver is blinded by the headlights of a vehicle that is approaching at night. In this case, the contrast between the ambient luminosity, which is known to be low at night, and the light intensity in the driver's field of vision, i.e. in angular range (or interval) 33, is in fact very high. Absolute maximum value $A_{max}$ is a measure of driver blinding by a light intensity that is very high overall. In this case, a contrast to the ambient luminosity is no longer a factor. This situation occurs, for example, when the driver is driving toward the sun just above the horizon.

Figure 4:
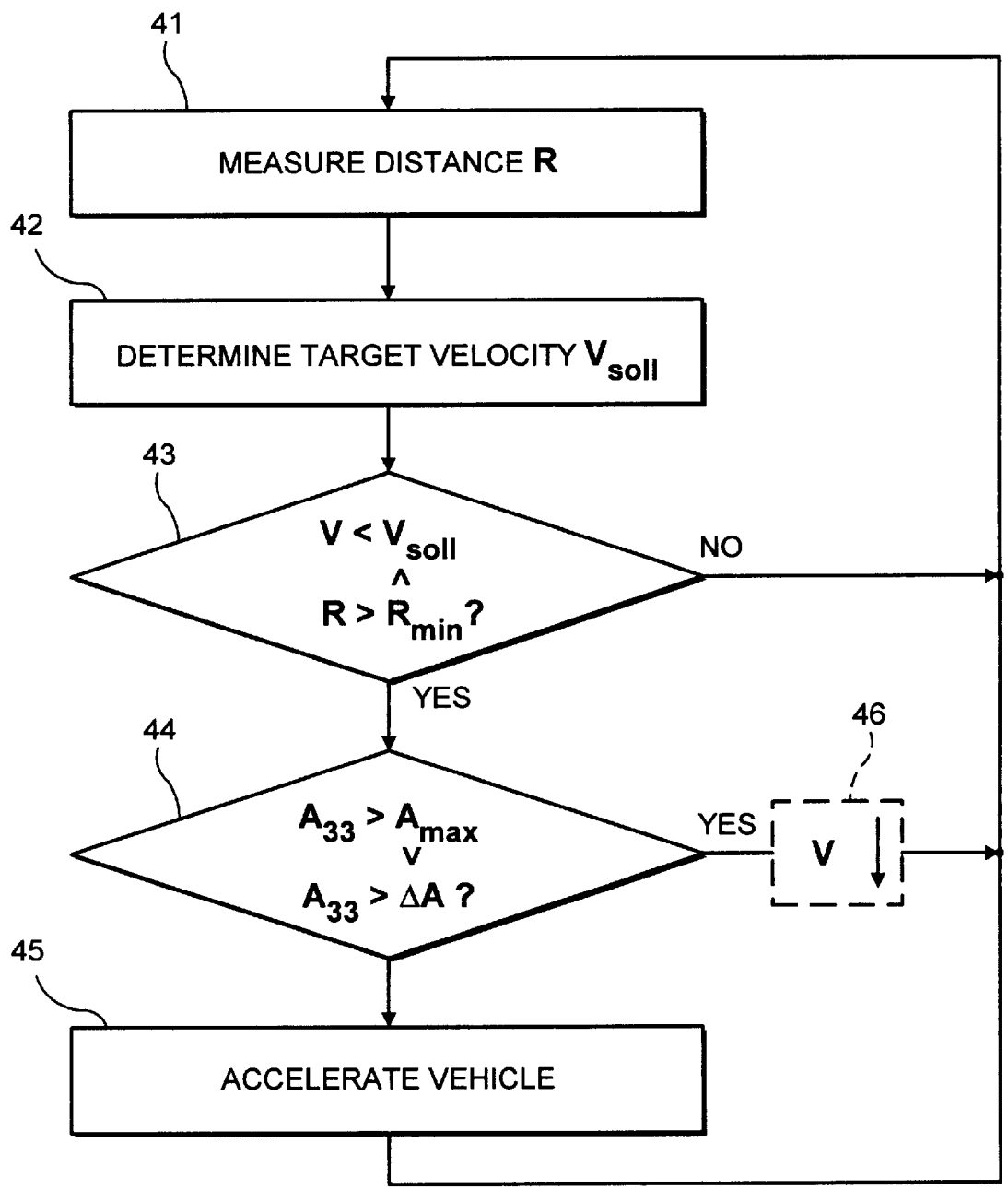
FIG. 4 shows an exemplary flowchart of a method according to the present invention.

FIG. 4 shows a flowchart of an embodiment of the method according to the present invention. According to Step 41, sensor 11 is used to measure a distance R to vehicles ahead of the controlled vehicle or other objects, based on conventional methods. In Step 42, a target velocity $v_{soll}$ of the controlled vehicle is measured as a function of at least measured distance R. According to conventional cruise control methods, other measured quantities and parameters can also be used for the method and device according to the present invention. Step 43 provides a query as to whether the instantaneous velocity v is less than target velocity $v_{soll}$ and whether prevailing distance R is greater than a defined minimum distance $R_{min}$. According to conventional cruise control methods and devices, the controlled vehicle accelerates if both conditions are met. If one of the two conditions is not met, the current vehicle velocity is maintained. In this case, the method branches back to Step 41.

If both conditions in Step 43 are met, another query as to whether signal amplitude $A_{33}$, which was measured in spatial or angular range 33 deemed relevant for the driver of the controlled vehicle, is at least partially greater than absolute maximum value $A_{max}$ or relative maximum value $\Delta A$ is presented in Step 44 according to the present invention. If one of the two above-mentioned conditions is met, the conclusion is drawn that the driver of the controlled vehicle is being blinded by the light of oncoming traffic in the current situation. According to a first embodiment of the present invention, the controlled vehicle is therefore not accelerated, and the method branches back to Step 41. If neither of the two conditions in query 44 is met, the vehicle is accelerated in the known manner in Step 45. The method subsequently starts over with Step 41.

Alternatively or in addition to the first embodiment of the present invention described, the current velocity of the controlled vehicle can be reduced in Step 46. According to a further alternative of the present invention, the controlled vehicle is accelerated in Step 46, but at a slower rate in this case, i.e. with a smaller acceleration setpoint $a_{soll}$ than in Step 45.

Simultaneously with the functions carried out when detecting driver blinding, the driver of the controlled vehicle is advantageously informed of the change in vehicle control response. This can be done, for example, using warning or information signal output 18.

In another alternative embodiment of the present invention, a video recording unit, for example a CCD or video camera, can also be used, as described above, instead of the described special blinding detection means shown in FIG. 2. A video recording unit of this type is used, in part, as a distance measuring means. In this case, the use of a combined distance measuring means and a blinding detection means is advantageous. With this arrangement, the evaluation of ambient luminosity, contrast, and light intensity can be carried out in the same manner as shown in FIG. 3.

What is claimed is:

1. A method for adjusting a velocity of a motor vehicle to a programmable target velocity, comprising the steps of:
   measuring an instantaneous velocity of the motor vehicle;
   measuring, using a distance sensor, at least one distance from the motor vehicle to an object which is in front of the motor vehicle, the object being one of a further vehicle and an obstacle;
   accelerating or decelerating the motor vehicle as a function of at least the measured at least one distance and the measured instantaneous velocity; and
   if a blinding sensor determines that a driver of the motor vehicle is blinded by a light of oncoming traffic, performing one of the following:
      reducing or eliminating a positive acceleration of the motor vehicle, and
      reducing the instantaneous velocity of the motor vehicle.

2. The method according to claim 1, wherein the blinding sensor determines that the driver is blinded by determining that a light intensity of the light exceeds a predetermined maximum value, the predetermined maximum value being in one of a spatial range and an angular range which is relevant for the driver.

3. The method according to claim 2, wherein the predetermined maximum value is an absolute maximum value.

4. The method according to claim 2, wherein the predetermined maximum value is a relative maximum value corresponding to an ambient luminosity.

5. The method according to claim 1, wherein the velocity of the motor vehicle is controlled in a closed loop.

6. A device for controlling a velocity of a motor vehicle, comprising:
   a distance sensor determining at least one distance between the motor vehicle and an object in front of the motor vehicle, the object being one of a further vehicle and an obstacle;
   a velocity measuring arrangement measuring an instantaneous velocity of the motor vehicle;
   a control unit determining at least one control quantity as a function of the measured at least one distance and the measured instantaneous velocity;

a plurality of actuators controlling at least one of a motor controller functional unit, a transmission controller functional unit and a brake controller functional unit as a function of the at least one control quantity;

a blinding detection arrangement detecting a driver blinding condition for a driver of the motor vehicle; and a controlling arrangement performing one of the following:

preventing or reducing an acceleration of the motor vehicle, and reducing the instantaneous velocity of the motor vehicle as a function of the driver blinding condition.

7. The device according to claim 6, wherein the blinding detection arrangement includes an at least one-dimensional array of light-sensitive elements for assigning a detected incoming light beam to one of a spatial range and an angular range which is relevant for the driver.

\* \* \* \* \*